Feb. 18, 1964 T. M. PETERSON 3,121,421
ROTARY INTERNAL COMBUSTION ENGINE
Filed April 11, 1962 4 Sheets-Sheet 1

INVENTOR.
TAFT M. PETERSON
BY
ATTORNEYS

INVENTOR.
TAFT M. PETERSON

BY

*Eyre, Mann & Lucas*
ATTORNEYS

Feb. 18, 1964  T. M. PETERSON  3,121,421
ROTARY INTERNAL COMBUSTION ENGINE
Filed April 11, 1962  4 Sheets-Sheet 3

INVENTOR.
TAFT M. PETERSON
BY
*Eyre, Mann & Lucas*
ATTORNEYS

Feb. 18, 1964     T. M. PETERSON     3,121,421
ROTARY INTERNAL COMBUSTION ENGINE
Filed April 11, 1962     4 Sheets-Sheet 4

INVENTOR.
TAFT M. PETERSON
BY
*ATTORNEYS*

United States Patent Office 3,121,421
Patented Feb. 18, 1964

3,121,421
ROTARY INTERNAL COMBUSTION ENGINE
Taft M. Peterson, 333 E. 43rd St., New York, N.Y.
Filed Apr. 11, 1962, Ser. No. 186,725
14 Claims. (Cl. 123—16)

This invention relates to a rotary internal combusion engine of the type which employs a rotor and slidable vanes in place of the cylinders and reciprocating pistons normally found in conventional gasoline internal combustion engines.

In the engine of the present invention, a stationary, hollow engine casing is employed which has an irregular interior wall in the form of a major cylindrical curve and a minor cylindrical curve. Positioned adjacent the minor cylindrical curve is a cylindrical rotor having a power shaft extending through its central axis and having a plurality of radial grooves in each of which at least one vane is slidably carried. During rotation of the rotor, these vanes slide out of the radial grooves under the influence af centrifugal force and maintain contact with the interior wall of the casing at all times, thereby providing separate compartments in which the functions of air intake, compression, fuel injection, ignition and exhaustion of combustion gases take place. Since the interior wall of the engine is in the form of cylindrical curves, operation of the engine is extremely smooth and efficient.

For the functions of air intake and exhaustion of combustion gases, two adjacent ports are provided along the major cylindrical curve of the interior casing wall, each of which permits entry and exit of gases respectively into and out from the interior of the engine. A valve body is affixed adjacent these ports which contains one-way valve means for each of the two ports. In the case of the inlet port, the one-way valve means is so arranged as to permit only entry of gases through said port and to prevent exit of gases therethrough. In the case of the outlet port, the one-way valve means is arranged in opposite fashion to permit exit of gases through said port and prevent entry of gases therethrough.

The inlet port is positioned in advance of the outlet port, relative to the direction of rotation of the rotor, with the result that each slidable vane sweeps by the inlet port and uncovers the same before reaching the outlet port. By this arrangement, a substantially constant volume of air, at substantially constant pressure, is automatically drawn into the interior of the engine in advance of each vane whereby the engine operates in a remarkably efficient and uniform manner irrespective of variations in atmospheric conditions or other factors which normally affect the operation of internal combustion engines.

After the constant volume of air has been drawn into the interior of the engine in advance of each vane, continued rotation of the rotor narrows the space between the exterior surface of the rotor and the major cylindrical curve along the interior wall of the casing with the result that the air volume is compressed. At the same time, the vane trailing behind the compressed air volume is continuously pushed back into the radial groove in which it is slidably carried and, by the time the vane has reached one junction where the major and minor cylindrical curves of the interior wall merge, it will be completely detracted into the radial groove.

Approximately at this point of junction, there is provided a compression inlet port which leads into a compression transfer channel, preferably having a venturi type configuration. The opposite end of this channel communicates with a compression outlet port leading to the minor cylindrical curve of the interior wall of the casing. A one-way valve means is interposed between the compression inlet port and the compression transfer channel for permitting only entry of gases into the transfer channel from the compression inlet port and preventing exit of gases in the opposite direction. As the compressed volume of air is forced into the compression transfer channel, it is stored in this channel by the one-way valve means until the open combustion chamber, trailing behind the vane which compressed the air volume, reaches the compression outlet port. At this time, finely divided droplets of liquid fuel are injected into the space just above the compression outlet port by means of an atomizing device whereby the fuel is intimately mixed with the compressed air which rushes out from the compression transfer channel, through the compression outlet port and into the open combustion chamber. In this way, a combustible fuel-air mixture is automatically injected into the combustion chamber without any need of a carburetor since the rush of compressed air out from the compression transfer channel is so great as to intimately mix the air with the atomized fuel injected into the path of the air flow and thereby provide a combustible fuel-air mixture.

The combustible fuel-air mixture is then carried in the combustion chamber along the minor cylindrical curve of the interior wall of the casing until the combustion chamber reaches ignition means positioned at the opposite junction of the major and minor cylindrical curves where the fuel-air mixture is ignited. By mixing and injecting the fuel-air mixture at one junction of the major and minor cylindrical curves and igniting the mixture at the opposite junction, any tendency towards pre-ignition of the fuel is avoided since the point of injection of the fuel-air mixture is relatively cool as compared to the point where the mixture is ignited.

As mentioned previously, the interior wall of the engine casing is irregular in the form of a major and minor cylindrical curve, with the radius of curvature of the major cylindrical curve being greater than that of the minor cylindrical curve. As used in the specification and claims herein, the term radius of curvature is intended to refer to the radii of the circles which would be formed if the major and minor cylindrical curves of the interior wall were continued to form closed circles. The major and minor cylindrical curves of the interior wall of the casing are preferably constructed and governed by an exact relationship according to the following equation:

$$r_2 = \frac{r_1(a^2 + 2a \cos 1/2\theta + 1)}{2(a + \cos 1/2\theta)} \qquad (I)$$

In Equation I:

$r_1$=The radius of curvature of the minor cylindrical curve $\theta$=The angle between successive radial grooves in the rotor $a$=A numerical constant having values from slightly greater than 1 to about 2.5

$r_2$=The radius of curvature of the major cylindrical curve

When Equation I is followed in constructing the engine casing, the centers of the radii of curvature of the major and minor cylindrical curves should also preferably be spaced apart an exact distance according to the following equation:

$$d = ar_1 - r_2 \qquad (II)$$

In Equation II, the terms $a$, $r_1$ and $r_2$ represent the same quantities as in Equation I and $d$ equals the distance between the centers of the radii of curvature of the major and minor cylindrical curves as measured from the center of the radius of curvature of the minor cylindrical curve along any radius extending therefrom. The significance and use of Equations I and II will be more fully explained hereinafter.

For a further understanding of details of the present invention, reference will be made to the accompanying drawings which illustrate a preferred embodiment of the invention and of which:

Figure 1:
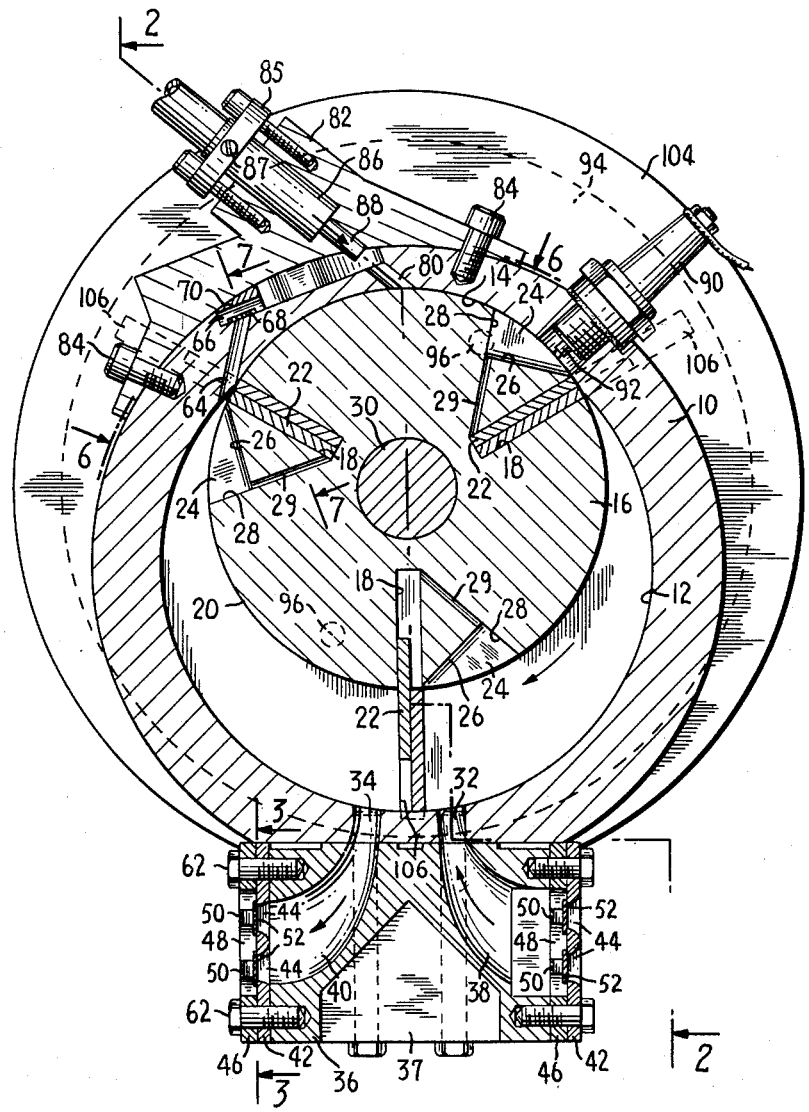
FIG. 1 is a transverse cross section through the assembled rotary engine.

Referring to FIG. 1 of the drawings, a hollow engine casing is there generally designated by reference numeral 10. The interior wall of the casing 10 is irregular in the form of a major cylindrical curve 12 and a minor cylindrical curve 14. As can be seen, the ends of the major and minor cylindrical curves 12 and 14 converge at two separate junctions along the interior wall of the casing 10.

Positioned adjacent the minor cylindrical curve is a cylindrical rotor 16. It will be evident that the radius of the cylindrical rotor 16 is substantially the same as the radius of curvature of the minor cylindrical curve 14, thereby permitting the rotor to be positioned and rotated adjacent the minor cylindrical curve. The rotor 16 contains a plurality of radial grooves 18, three being illustrated specifically, which are spaced equal angular distances apart from each other and which extend into the rotor from the exterior surface 20 thereof. The radial grooves 18 extend axially along the entire length of the rotor 16, and each contains at least one slidable vane 22, with two being illustrated specifically.

Adjacent each of the grooves 18 is positioned an open combustion chamber 24 which extends into the rotor 16 from the exterior surface 18 thereof. These combustion chambers 24 are positioned intermediate the ends of the rotor 16 and arranged to trail behind each of the grooves 18 during rotation of the rotor in clockwise direction as indicated by the arrow. The shape of the combustion chamber 24 is preferably substantially in the form of a right triangle in transverse section, with one leg 26 being substantially longer than the other leg 28. The longer leg 26 extends into the rotor from the trailing edge of the adjacent groove 18 at an angle of approximately 45° with respect to the radial line of the groove 18. A bleeder channel 29 provides an open connection between the base of each combustion chamber 24 and the base of each radial groove 18. The power shaft 30 extends through the rotor 16 along the central axis thereof.

At approximately the mid-point along the major cylindrical curve 12, the two adjacent inlet and outlet ports, 32 and 34 respectively, lead into the hollow interior of the casing 10. A valve body, indicated at 36, is bolted to the engine adjacent the ports 32 and 34. In order to minimize unnecessary weight, a substantial portion of the valve body 36 is cut away, leaving the generally triangular open space 37 in the bottom thereof. The valve body 36 contains hollow inlet and outlet conduits, 38 and 40, which communicate with the ports 32 and 34 respectively. Mounted against the open outer ends of the hollow conduits 38 and 40 are one-way valve means which are of the same basic construction for both conduits but mounted in reverse manner to provide one-way entry and exit gas seals respectively at the outer ends of the hollow conduits 38 and 40.

Figure 3:
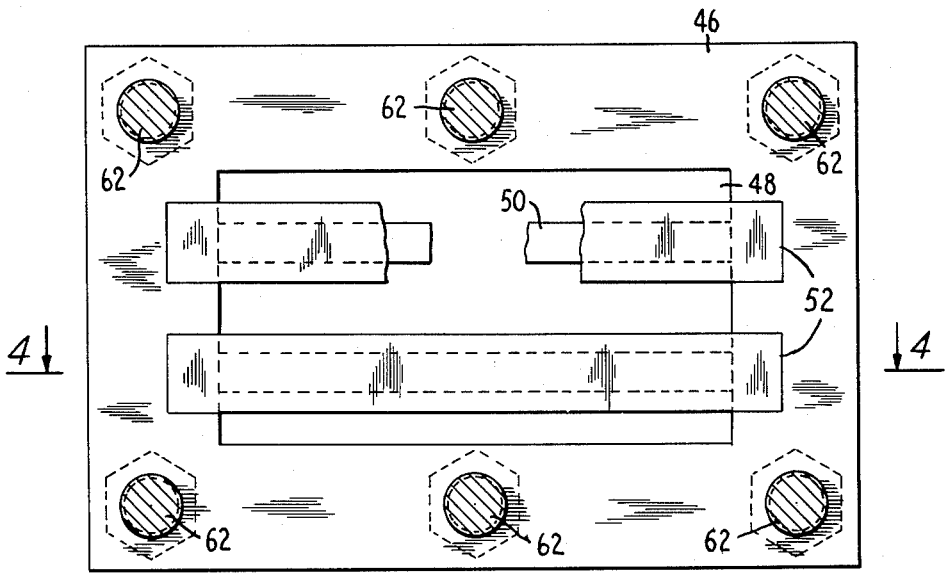
FIG. 3 is a vertical section through the valve body attached to the engine casing taken along line 3—3 of FIG. 1.
Figure 4:
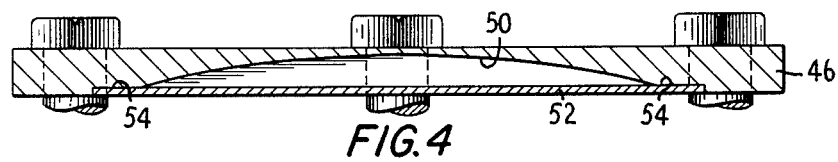
FIG. 4 is a horizontal section through the valve body taken along line 4—4 of FIG. 3.
Figure 5:
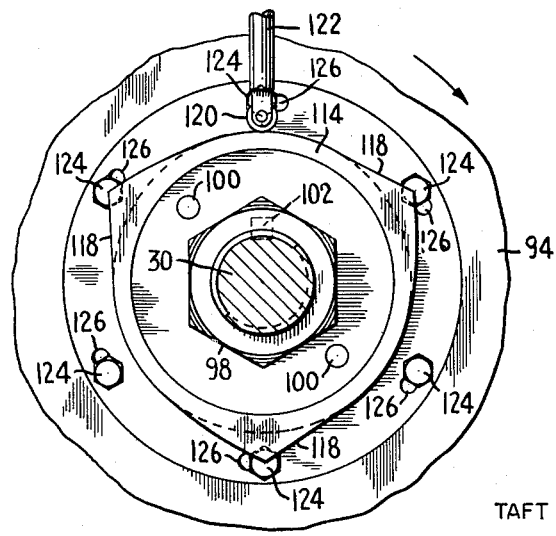
FIG. 5 is an end view taken along line 5—5 of FIG. 2.

Considering the one-way valve means shown at the left-hand side of the valve body 36 in FIG. 1, such means includes a plate 42 with two rectangular openings 44. Adjacent plate 42 is a second plate 46 with a single rectangular opening 48. This rectangular opening 48 is bridged by two ribs 50 which each have one concave surface, bowed outwardly away from the first plate 42, as best illustrated in FIGS. 3 and 4. Adjacent the bowed ribs 50 are rectangular strips of spring metal 52 which are larger than the openings 44 of plate 42 and which normally cover the openings 44. As can be seen in FIG. 4, appropriate portions of the face of plate 46 which is in contact with plate 42 are shouldered as at 54 to provide retaining slots for the strips of spring metal 52 to maintain these strips in sealing position over the openings 44 of plate 42. The two plates 42 and 46 are mounted adjacent the open outer end of the hollow conduit 40 by means of bolts 62.

The operation of the one-way valve means, which has now been described, is automatic depending on the gas pressure in the hollow conduit 40. When the pressure in the conduit 40 is approximately the same or less than the pressure on the opposite side of the spring metal strips 52, the strips lie flat over the opening 44 of plate 42 so that no gases can enter into the conduit 40 from the atmosphere. When, however, the gas pressure in the conduit 40 is greater than the pressure on the opposite side of the spring metal strips 52, the metal strips are bowed outwardly against the concave surfaces of ribs 50 of plate 46. As a result, gases may pass through the openings 44, around the spring metal strips 52, and out through the main opening 48 of plate 46. As soon as the gas pressure in conduit 40 falls to about the same or less than the pressure on the opposite side of the spring metal strips 52, the strips 52 spring back to the flat sealing position over the openings 44 of plate 42 and gases are again excluded from entering into the conduit 40 from the atmosphere.

The one-way valve means at the right-hand side of the valve body 36 in FIG. 1, covering the outer end of hollow conduit 38, is exactly the same in structure as the one described hereinabove except that the plates 42 and 46 are mounted against the opening of the conduit 38 in reverse manner, that is to say, plate 46 is mounted immediately adjacent the opening of the conduit 38 and plate 42 is farthest removed from the outer end of conduit 38. It will be evident that, because of the reverse manner of mounting, the one-way valve means at the outer end of conduit 38 will automatically operate to permit entry of gases from the atmosphere into the conduit 38 whenever the gas pressure in the conduit 38 is less than the pressure on the opposite side of the spring metal strips 52. At the same time, whenever the gas pressure in the hollow conduit 38 is about atmospheric or higher, gases can neither exit from nor enter into the hollow conduit 38 from the atmosphere.

Figure 6:
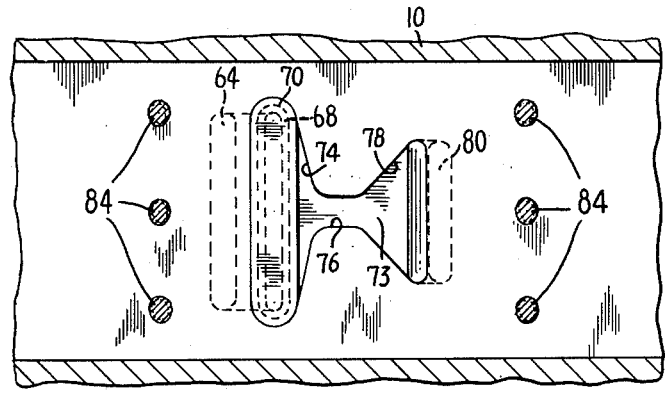
FIG. 6 is a view taken along line 6—6 of FIG. 1.
Figure 7:
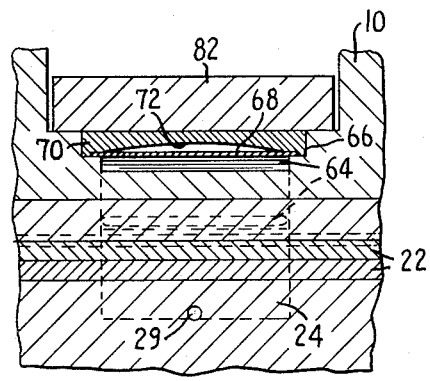
FIG. 7 is a section taken along line 7—7 of FIG. 1.

At approximately the one junction of the major and minor cylindrical curves 12 and 14 of the interior wall of the casing 10 which immediately follows the outlet port 34 in angular position relative to the direction of rotation of the rotor 16, there is positioned a compression inlet port 64 which extends from the interior wall up into the body of the casing 10. At the upper end of the port 64, a shoulder 66 is provided, larger in area than the open space of the port 64 (FIGS. 6 and 7). The shoulder 66 provides a seat for a one-way valve means which is comprised of a strip of spring metal 68 which is large enough to cover the upper opening of the port 64. A retaining rib 70 is positioned over the spring metal strip 68 and completely fills the shoulder 66. The retaining rib 70 is bowed or arched upwardly, away from the opening of the port 64, to provide a concave surface as at 72. The compression inlet port 64 communicates with a compression transfer channel, indicated generally at 73, with the opposite end of the channel communicating with a compression outlet port 80. As illustrated, the compression transfer channel is preferably in the form of a venturi type configuration comprised of a converging section 74, a constricted throat section 76 and a diverging section 78. The venturi configuration accelerates and aids the flow of compressed air when fuel is being mixed therewith. The compression outlet port 80 extends down to the interior wall of the engine casing 10 at approximately the midpoint of the minor cylindrical curve 14 thereof. The compression transfer channel 73 is covered by the block 82 which is bolted to the casing 10 as at 84. Whenever the gas pressure in the compression inlet port 64 is greater than the pressure in the compression transfer channel 73, the spring metal strip 68 will be bowed upwardly against the retaining rib 70 to permit the flow of gases into the channel. When the gas pressure in the compression transfer channel 73 is approximately the same or greater than the pressure in the compression inlet port 64, the spring metal strip 68 will return to its flat sealing position over the port 64 and thereby prevent flow of gases in the reverse direction back into the port 64.

As shown in FIG. 1 the block 82 contains a fuel injection means 86, held adjustably in place by the retaining ring 85 and the set screw 87. The fuel injection means 86 comprises a conventional atomizing device by which finely divided droplets of liquid fuel can be sprayed out from the tip 88 of the device. As can be seen, the droplets of fuel are dispensed into the space immediately above the compression outlet port 80. At approximately the opposite junction of the major and minor cylindrical curves 12 and 14 of the interior wall of the casing 10, conventional firing means, such as the spark plug 90, is provided with the electrode 92 thereof being positioned adjacent the line of the minor cylindrical curve 14 of the interior wall of the casing 10.

Figure 2:
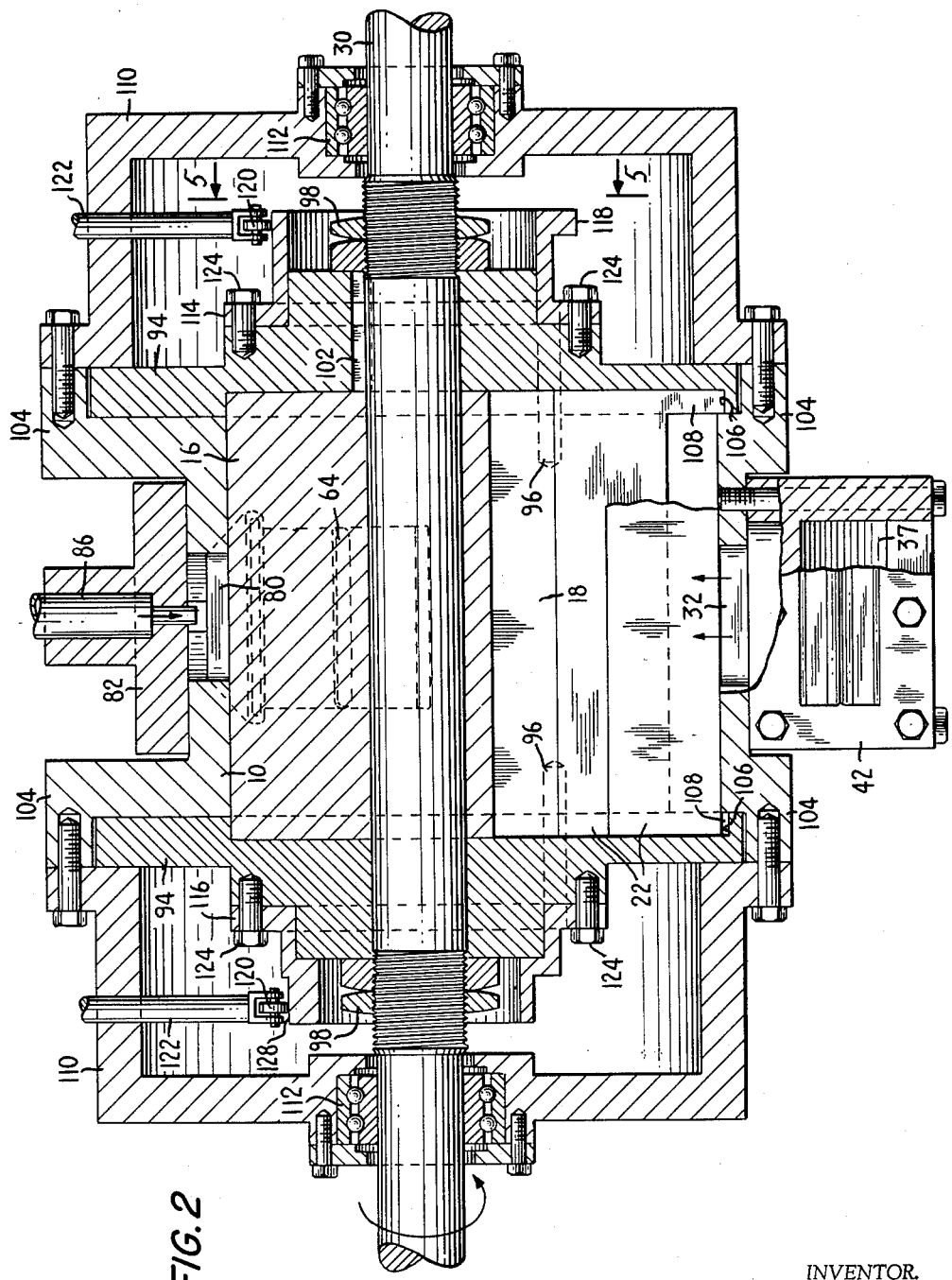
FIG. 2 is a longitudinal section through the engine taken along the line 2—2 of FIG. 1.

As best shown in FIG. 2, circular end plates 94 are press fitted against the ends of the cylindrical rotor 16 and held in place by means of the dowels 96 and the lock nuts 98 screwed over the threaded portions of the power shaft 30. Jack screw holes 100 extend through the end plates 94 to provide means for readily breaking the frictional grip of the dowels 96 and disassembling the rotor and end plates 94. The key 102 locks the power shaft to one of the end plates 94 for rotation with the end plates 94 and the press fitted rotor 16.

The end plates 94 are machined to close tolerances and so dimensioned as to fit and rotate within the L-shaped flanges 104 provided at the ends of the engine casing 10. The end plates 94 also contain radial grooves 106 which are in alignment with and the same in number as the grooves 18 contained in the rotor 16. In the embodiment illustrated in the drawings, the outward radial extent of the grooves 106 is slightly greater than the point along the major cylindrical curve 12 of the interior wall spaced farthest away from exterior surface 20 of the rotor 16. As a result, the outer ends of the radial grooves 106 will always be positioned radially beyond the major and minor cylindrical curves 12 and 14 of the casing 10 through a complete revolution of the end plates 94. This arrangement is necessary because of the fact that two sliding vanes 22 are carried in each of the radial grooves 18 of the rotor 16. If only one vane 22 were used in each of the radial grooves 18, then the radial extent of the grooves 106 in the end plates 94 would preferably be coextensive with the point along the major cylindrical curve 12 spaced farthest away from the rotor 16 as will be more fully explained hereinafter.

As shown in FIG. 2, one of the pair of vanes 22 is a leading vane, relative to the direction of rotation of the rotor 16, and the other, positioned immediately adjacent the combustion chamber 24, is a trailing vane. The leading vane 22 has a rectangular body which is smaller in width than the radial width of the radial grooves 18 in the rotor 16. The leading vane 22 extends axially beyond the grooves 18 and into the radial grooves 106 of the end plates 94. The leading vane 22 also has two extensions or legs 108 at the axial ends thereof. These extensions 108 are of an axial length which is about the same as the axial depth of the radial grooves 106, and the extensions are thus carried solely within the radial grooves 106 of the end plates 94. The trailing vane 22 is also rectangular and of a width approximately the same as the radial width of the leading vane 22. The trailing vane 22 also extends axially out into the radial grooves 106 of the end plates 94. During rotation of the rotor, the leading vane 22 will slide out from the radial groove 18 until the legs 108 thereof reach the outer end of the radial groove 106 of the end plates 94. The trailing vane 22, however, will slide completely out of the radial groove 18 in the rotor 16 until it contacts the interior wall along the major cylindrical curve 12 of the engine casing 10. By this arrangement, a maximum gas seal is achieved between the compartments defined by each successive pair of vanes 22, the exterior surface 20 of the rotor 16 and the major cylindrical curve 12 along the interior wall of the casing 10. At the same time, the vanes 22 are fully supported and guided in sliding movement by the radial grooves 106 in the end plates 94.

As shown in FIG. 2, the ends of the engine casing 10 are completely closed off by the cover plates 110 which are bolted to the L-shaped flanges 104 of the casing 10. The cover plates 110 also contain ball bearing supports 112 to permit rotation of the power shaft 30. Mounted upon the outer ends of each of the end plates 94 are the cap pieces 114 and 116 respectively. The cap piece 114 includes the cam surfaces 118 which are the same in number as the number of radial grooves 18 in the rotor 16. The cam follower 120 rides over the cap piece 114 and communicates a reciprocating movement corresponding to the shape of the cam surfaces 118 by means of the rod 122 which extends out from the interior of the engine through the cover plate 110. The movement communicated by the rod 112 is used to time the firing of the spark plug 90 in conventional manner (not shown). It will be noted that the cap piece 114 is mounted upon the end plate 94 by means of bolts 124 which extend through slots 126 larger in cross section than the thickness of the bolts 124. This permits adjustment of the angular position of the cap piece 114 so that the cam surfaces 118 may be located exactly to correspond with the position of the radial grooves 18 in the rotor 16.

The cap piece 116 is mounted to the opposite end plate 94 in exactly the same manner as described for the cap piece 114 and also employs the cam follower 120 connected to the rod 122. However, the cap piece 116 has cam surfaces 128 which are of lesser radial length than the cam surfaces 118 of the cap piece 114, and the reciprocating movements derived from the cam surfaces 128 are employed for the purpose of timing the injection of fuel through the fuel injection means 88 in conventional manner (not shown).

While the engine has now been described in a specific embodiment utilizing a pair of vanes 22 in each of the radial grooves 18, if desired, only a single vane may be employed in each of the radial grooves. In this event, the selected width of the vane will be sufficient to slide out and contact all points along the interior wall of the casing 10, but a portion of the vane will also remain disposed within the radial groove 18 in the rotor 16 to provide the necessary gas tight seals at the exterior surface 20 of the rotor and along the interior wall of the casing. Also the outward radial extent of the radial grooves 106 in the end plates 94 will be coextensive with the point along the major cylindrical curve 12 of the casing 10 spaced farthest away from the exterior surface 20 of the rotor 16. Aside from these differences, the engine is constructed in the same manner as described hereinabove when only one slidable vane is employed.

As mentioned previously, it is preferred that the major and minor cylindrical curves of the interior wall of the engine casing be constructed and arranged according to the equation:

$$r_2 = \frac{r_1(a^2 + 2a \cos 1/2\theta + 1)}{2(a + \cos 1/2\theta)} \quad (I)$$

Depending on the engine size required for a particular use, $r_1$, the radius of curvature of the minor cylindrical curve 14, may be selected as desired. Before $r_2$, the radius of curvature of the major cylindrical curve 12, can be computed, however, a value must be selected for the numerical constant $a$. This constant is a measure of the maximum distance between the center of the cylindrical rotor 16 and the point on the major cylindrical curve 12 spaced farthest away from the exterior surface 20 of the rotor, as compared to the radius of curvature of the minor cylindrical curve 14 along the interior wall of the casing 10. With the embodiment disclosed in the drawings the constant $a$ may be a number from slightly greater than 1 up to about 2.5. For example, if the constant is selected to be 1.5, then the distance between the center of the rotor 16 and the point on the major cylindrical curve 12 spaced farthest away from the exterior surface 20 of the rotor will be 1.5 times the radius of curvature of the minor cylindrical curve 14. Different values for the $a$ constant will provide greater or smaller volumes between the cylindrical rotor 16 and the major cylindrical curve 12 along the interior wall of the casing and this, in turn, is one way to vary the power that is developed by the engine.

Once the value for the constant $a$ has been selected, the radius of curvature of the major cylindrical curve 12 is readily computed by means of Equation I. In order to locate correctly the centers of the radii of curvature of the major and minor cylindrical curves 12 and 14, the equation:

$$d = ar_1 - r_2 \quad (II)$$

is employed, with the $a$, $r_1$ and $r_2$ values obtained from the calculation with Equation I being inserted in Equation II. The $d$ distance so calculated may be measured off from the center of the cylindrical rotor 16 along any radius extending therefrom, since the centers of the rotor and of the minor cylindrical curve 14 are located at the same point. In the embodiment of the engine illustrated in FIG. 1 of the drawings, the $d$ distance has been measured on the vertical radius extending downwardly and perpendicular to the horizontal diameter of the rotor as will be evident from the upright position of the engine.

The maximum value of the constant $a$ is limited only by the capability of the vanes 22 to slide out and provide gas tight seals at the point on the major cylindrical curve 12 farthest spaced away from the exterior surface 20 of the rotor 16. In the embodiment illustrated in the drawings where two vanes 22 are employed, the rectangular width of these vanes can be increased or decreased to cover all ranges of values of the constant $a$ from slightly greater than 1 to about 2.5. However, if more than two vanes are employed, with appropriate extensions for the radial grooves 108 in the end plates 94 on all but the last trailing vane, the value of the constant $a$ may be greater than 2.5 since the vanes will telescope out from the radial grooves 18 in the rotor 16 through a greater distance and will provide a seal along all portions of the major cylindrical curve 12 in the interior wall of the casing 10.

Operation of the engine may be best understood by reference to FIG. 1 of the drawings. Assume that the rotor is in the position shown in FIG. 1 and that a combustible fuel-air mixture is contained in the open combustion chamber 24 immediately opposite spark plug 90. As the common edge between the radial groove 18 and the longer leg 26 of the combustion chamber 24 rotates slightly beyond the junction of the major and minor cylindrical curves 12 and 14, the fuel-air mixture is ignited by timed firing of the spark plug 90. The force of the expanding combustion gases acts upon the sliding vanes 22, which by now are partially extended out from the groove 18, to drive the rotor 16 in clockwise rotation. The vanes 22 slide outwardly from centrifugal force to provide a continuous seal along the major cylindrical curve 12 of the interior wall as the rotor continues to rotate in clockwise direction. In this connection, some of the combustion gases are conducted through the bleeder channel 29 to the base of the groove 18 and a partial pressure is thereby applied to the vanes 22, positively forcing the vanes into engagement with the interior wall of the casing 10. As the rotor continues to rotate, the length of the rotating torque arm represented by the vanes 22 and acted upon by the expanding combustion gases continuously increases as the vanes slide farther out from the radial groove 18 so that maximum torque is developed from the pressure of the combustion gases. When the vanes 22 reach the position intermediate the inlet and outlet ports 38 and 40, as shown in FIG. 1, the hot combustion gases will not be exhausted from the engine interior, although the inlet port has been uncovered, since the one-way valve means associated with the inlet conduit 38 does not open until the pressure in the inlet conduit falls to below atmospheric, assuming that the engine is being operated in the atmosphere. As the vanes 22 sweep past the outlet ports 40, however, the pressure of the hot combustion gases forces open the spring metal strips 52 of the one-way valve means associated with the outlet conduit 40 and the hot combustion gases are rapidly exhausted from the interior of the engine. In a fraction of a second, the pressure in the exhausted interior drops to below atmospheric and the one-way valve means associated with the outlet conduit 40 is thereby closed. Simultaneously, the one-way valve means associated with the inlet conduit 38 now opens and air is sucked into the interior engine space trailing behind the pair of vanes 22 whose route is being traced in this description of operation. As soon as the volume of air that is sucked into the engine raises the pressure in the inlet conduit 38 to about atmospheric, the one-way valve means associated with this conduit closes so that no more air will enter the engine. In the event that sufficient air is sucked into the engine to increase the gas pressure in the engine interior to above atmospheric, the one-way valve means associated with the outlet conduit 40 will automatically open to bleed off a minor volume of air until the pressure in the engine interior falls to about atmospheric. By the time the next pair of vanes 22, following the pair whose route is being traced, has reached the intermediate position between the inlet and outlet ports 38 and 40, the volume of air in the space preceding the next following pair of vanes will be substantially at atmospheric pressure due to the automatic operation of the pair of one-way valve means associated with the inlet and outlet conduits 38 and 40. By this arrangement, the volume and pressure of air supplied to the engine remains substantially uniform and constant throughout operation. As the next following pair of vanes 22 rotate by the outlet port 34, the volume of the space in advance of this pair of vanes begins to decrease, due to the gradual convergence of the curvatures of the major cylindrical curve 12 and the exterior surface 20 of the rotor 16, and the air contained in the space is consequently compressed. When compression has reached a predetermined pressure, the one-way valve means associated with the compression inlet port 64 will open and the compressed air will be forced up into the compression transfer channel 73 communicating with the compression inlet port. At the time the compressed air begins to move into the compression transfer channel 73, the preceding combustion chamber 24, immediately adjacent the pair of vanes whose route is being traced, has already rotated by the opening of the compression outlet port 80 in the interior wall of the casing 10 so that the exterior surface 20 of the rotor 16 will seal off this opening and prevent escape of the compressed air being forced up into the compression transfer channel. As the pair of vanes 22, next following the pair whose route is being traced, travels by the opening of the compression inlet port 64, the gas pressure in the compression inlet port immediately drops since the constant volume of air contained in the engine interior space following this pair of vanes is not yet compressed and the pressure in the compression transfer channel 73 is very much greater than the pressure in the engine interior space. As a result, the one-way valve means interposed between the compression inlet port 64 and the compression transfer channel 73 will close to prevent the compressed air in the channel from escaping back into the interior of the engine. The compressed air remains stored in the compression transfer channel 73 until the combustion chamber 24 immediately adjacent the pair of vanes 22, next following the pair whose route is being traced, reaches the opening of the compression outlet port 80, at about the mid-point of the minor cylindrical curve 14 of the engine casing 10. At this time, the compressed air immediately rushes out from the compression transfer channel 73, being greatly accelerated by the venturi configuration thereof, and flows into the open combustion chamber 24 through the compression outlet port 80. Simultaneously, the fuel dispensing device 86 is timed to inject atomized droplets of liquid fuel into the path of flow of the compressed air. As the shorter leg 28 of the combustion chamber 24 begins to close off the opening of the compression outlet port 80, injection of fuel is timed to cease. The combustible fuel-air mixture so injected into the combustion chamber 24 is then carried by continued rotation of the rotor 16 to the opposite junction of the major and minor cylindrical curves 12 and 14 along the interior wall of the engine. At this point, the combustible fuel-air mixture is ignited and the engine begins its second cycle of operation.

As will be evident, the engine utilizes a minimum of moving parts and completely automatic valve means for control of the functions of air intake, compression, fuel mixing and exhaustion of combustion gases. The compression transfer channel with the associated compression inlet and outlet ports eliminates the need for any carburetor since the violent flow of compressed air out from the channel is sufficient to cause intimate mixing of the air with the atomized droplets of fuel to provide a combustible fuel-air mixture. This fuel injection system is materially aided by use of the venturi type configuration.

The engine may be jacketed in known manner for circulation of a liquid cooling medium and it will be understood that conventional flanges are to be provided to mount the engine upon a support or framework for use. Also, a starter motor will be connected to the engine in conventional manner in order to initiate its operation. The engine may be operated with virtually any combustible liquid fuel.

It will be understood that it is intended to cover all changes and modifications of the preferred form of structure herein chosen for the purpose of illustration which do not constitute departures from the spirit and scope of the invention.

What is claimed is:

1. A rotary internal combustion engine comprising a stationary hollow casing having an irregular interior wall in the form of a major cylindrical curve and a minor cylindrical curve, the ends of said curves converging at two separate junctions and the radius of curvature of said major cylindrical curve being larger than that of said minor cylindrical curve, a rotor having a cylindrical exterior surface mounted for rotation adjacent said minor cylindrical curve, a plurality of radial grooves extending into said rotor from the exterior surface thereof, said grooves being spaced equal angular distances apart from each other and extending axially along the entire length of said rotor, at least one vane slidably carried in each of said grooves, an open combustion chamber positioned adjacent each of said grooves in the exterior surface of said rotor and intermediate the ends thereof, said combustion chamber being so positioned as to trail said groove during rotation of said rotor, an inlet and outlet port positioned adjacent each other along said major cylindrical curve of said interior wall, said inlet port being positioned in advance of said outlet port relative to the direction of rotation of said rotor, one-way valve means associated with said inlet and outlet ports for permitting solely entry and exit of gases respectively through said inlet and outlet ports, a compression inlet port positioned approximately at one said junction of said major and minor cylindrical curves which immediately follows said outlet port in angular position relative to the direction of rotation of said rotor, a compression outlet port positioned along said minor cylindrical curve of said casing, a compression transfer channel communicating between said compression inlet and outlet ports, one-way valve means interposed between said compression inlet port and said compression transfer channel for permitting flow of gases solely from said compression inlet port into said channel, means positioned on said casing for dispensing finely divided droplets of combustible liquid fuel into said compression outlet port, and ignition means positioned approximately at the second said junction of said major and minor cylindrical curves for igniting a combustible fuel-air mixture injected into said combustion chambers during rotation of the rotor.

2. An engine in accordance with claim 1 in which the radii of curvatures of said major and minor cylindrical curves is defined according to the equation:

$$r_2 = \frac{r_1(a^2 + 2a \cos 1/2\theta + 1)}{2(a + \cos 1/2\theta)}$$

in which:

$r_1$ = the radius of curvature of said minor cylindrical curve,
$\theta$ = the angle between any two successive radial grooves in said rotor,
$a$ = a number from slightly greater than 1 to about 2.5,
$r_2$ = the radius of curvature of said major cylindrical curve, and in which the distance between the centers of the radii of curvatures of said major and minor cylindrical curves are defined by the equation:

$$d = ar_1 - r_2$$

in which $a$, $r_1$ and $r_2$ are the same as in said first mentioned equation, the distance $d$ being measured from the center of said rotor along any radius extending therefrom.

3. An engine in accordance with claim 1 in which a bleeder channel communicates between the inner end of each of said radial grooves in said rotor and the inner end of each of said adjacent combustion chambers.

4. An engine in accordance with claim 1 in which each of said combustion chambers has a transverse cross section substantially in the form of a right triangle, with one leg being longer than the other, said longer leg extending into said rotor from the exterior surface thereof at an angle of approximately 45° with respect to the radial line of said radial groove immediately adjacent said combustion chamber.

5. An engine in accordance with claim 1 in which said one-way valve means associated with said inlet port is adapted to open and permit entry of gases into said inlet port whenever the gas pressure in said inlet port is less than the gas pressure on the side of said valve means opposite said inlet port and in which said one-way valve means associated with said outlet port is adapted to open and permit exit of gases from said outlet port whenever the gas pressure on the side of said valve means opposite said outlet port is less than the gas pressure in said outlet port.

6. An engine in accordance with claim 1 in which said one-way valve means interposed between said compression inlet port and said compression transfer channel is adapted to open and permit flow of gases from said compression inlet port into said compression transfer channel whenever the gas pressure in said compression inlet port is greater than the gas pressure in said compression transfer channel.

7. A rotary internal combustion engine comprising a stationary hollow casing having an annular L-shaped flange at each end thereof and having an irregular interior wall in the form of a major cylindrical curve and a minor cylindrical curve, the ends of said curves converging at two separate junctions and the radius of curvature of said major cylindrical curve being greater than that of said minor cylindrical curve, a rotor having a cylindrical exterior surface mounted for rotation adjacent said minor cylindrical curve, a plurality of radial grooves extending into said rotor from the exterior surface thereof, said grooves being spaced equal angular distances apart from each other and extending axially along the entire length of said rotor, at least one vane slidably carried in each of said grooves, said vane extending axially along the entire length of said groove and out beyond the axial ends of said groove, a circular end plate mounted against each end of said rotor and rotatably disposed within said annular L-shaped flange, said end plate having a plurality of radial grooves the same in number and in angular alignment with said radial rotor grooves, the outward radial extent of said radial end plate grooves being at least coextensive with the point along said major cylindrical curve which is radially spaced farthest away from said exterior surface of said rotor, a power shaft extending through said rotor and said end plates along the central axis thereof, an open combustion chamber positioned adjacent each of said radial rotor grooves in the exterior surface of said rotor and intermediate the ends thereof, said combustion chamber being so positioned as to trail said radial rotor groove during rotation of said rotor, an inlet and outlet port positioned adjacent each other along said major cylindrical curve of said interior wall, said inlet port being positioned in advance of said outlet port relative to the direction of rotation of said rotor, a valve body mounted adjacent said inlet and outlet ports, said valve body containing an inlet conduit and an outlet conduit each of which communicates with said inlet and outlet ports respectively, one-way valve means mounted adjacent the open outer ends of said inlet and outlet conduits, said inlet conduit one-way valve means permitting entry of gases into said inlet conduit only when the gas pressure in said inlet conduit is less than the gas pressure outside of said inlet conduit one-way valve means, said outlet conduit one-way valve means permitting exit of said gases from said outlet conduit only when the gas pressure in said outlet conduit is greater than the gas pressure outside of said outlet conduit one-way valve means, a compression inlet port positioned approximately at one said junction of said major and minor cylindrical curves which immediately follows said outlet port in angular position relative to the direction of rotation of said rotor, said compression inlet port extending upwardly into said casing, a compression outlet port positioned along said minor cylindrical curve of said interior casing wall, said compression outlet port also extending upwardly into said casing, a compression transfer channel having a venturi type configuration comprised of a converging section, a constricted throat section, and a diverging section, said compression transfer channel communicating between the upper ends of said compression inlet and outlet ports in said casing, one-way valve means interposed between said compression inlet port and said compression transfer channel for permitting flow of gases solely from said compression inlet port into said channel, said interposed one-way valve means permitting flow of gases therethrough only when the gas pressure in said compression transfer channel is less than the gas pressure in said compression inlet port, means positioned on said casing for dispensing finely divided droplets of combustible liquid fuel into said compression outlet port, and ignition means positioned approximately at the second said junction of said major and minor cylindrical curves for igniting a combustible fuel-air mixture injected into said combustion chambers during rotation of said rotor.

8. An engine in accordance with claim 7 in which the radii of curvatures of said major and minor cylindrical curves is defined according to the equation:

$$r_2 = \frac{r_1(a^2 + 2a \cos 1/2\theta + 1)}{2(a + \cos 1/2\theta)}$$

in which:

$r_1$=the radius of curvature of said minor cylindrical curve,
$\theta$=the angle between any two successive radial grooves in said rotor,
$a$=a number from slightly greater than 1 to about 2.5,
$r_2$=the radius of curvature of said major cylindrical curve, and in which the distance between the centers of the radii of curvature of said major and minor cylindrical curves are defined by the equation:

$$d = ar_1 - r_2$$

in which $a$, $r_1$ and $r_2$ are the same as in said first mentioned equation, the distance $d$ being measured from the center of said rotor along any radius extending therefrom.

9. An engine in accordance with claim 7 in which the one-way valve means mounted adjacent the open outer end of said inlet conduit comprises a first plate immediately adjacent said open outer end and having an opening therein, said opening in said first plate being bridged by two spaced ribs each having a concave surface arched toward said inlet conduit, a flat strip of spring metal positioned adjacent each of said concave surfaces of said two ribs, a second plate mounted adjacent said first plate so that said first plate is interposed between the open outer end of said inlet conduit and said second plate, said second plate having two openings each of which is covered by each of said strips of spring metal, and in which the one-way valve means mounted adjacent the open outer end of said outlet conduit is comprised also of said first and second plates, but said second plate is mounted immediately adjacent the open outer end of said outlet conduit, and said first plate is mounted adjacent said second plate so that said second plate is interposed between the open outer end of said outlet conduit and said first plate.

10. A rotary internal combustion engine comprising a stationary hollow casing having an annular L-shaped flange at each end thereof and having an irregular interior wall in the form of a major cylindrical curve and a minor cylindrical curve, the ends of said curves converging at two separate junctions and the radius of curvature of said major cylindrical curve being greater than that of said minor cylindrical curve, a rotor having a cylindrical exterior surface mounted for rotation adjacent said minor cylindrical curve, a plurality of radial grooves extending into said rotor from the exterior surface thereof, said grooves being spaced equal angular distances apart from each other and extending axially along the entire length of said rotor, a circular end plate mounted in fixed position adjacent each end of said rotor, and rotatably disposed within said annular L-shaped flange, said circular end plate having a plurality of radial grooves the same in number as and in alignment with said rotor radial grooves, the outward radial extent of said end plate radial grooves being slightly greater than the point along said major cylindrical curve of said casing which is radially spaced farthest away from the exterior surface of said rotor, a leading vane and a trailing vane slidably carried in said rotor and said end plate radial grooves, said leading vane preceding said trailing vane in angular position relative to the direction of rotation of said rotor and said end plates, said leading vane comprising a rectangular plate having a radial extension at each end thereof, said extensions being disposed radially outwardly from said plate and being carried solely within said end plate radial grooves, said trailing vane comprising a rectangular plate approximately the same in width as said leading vane, an open combustion chamber positioned in the exterior surface of said rotor adjacent said trailing vane and intermediate the ends of said rotor, a power shaft extending through said rotor and said end plates along the central axis thereof, an inlet port and an outlet port positioned adjacent each other at approximately the mid-point along said major cylindrical curve of said casing, said inlet port being positioned in advance of said outlet port relative to the direction of rotation of said rotor and said end plates, a valve body mounted adjacent said inlet and outlet ports, said valve body containing an inlet conduit communicating with said inlet port and containing an outlet conduit communicating with said outlet port, one-way valve means mounted adjacent the open outer end of said inlet conduit and adapted to permit solely entry of gases into said inlet conduit whenever the gas pressure therein is less than the gas pressure at the side of said valve means opposite said inlet conduit, one-way valve means mounted adjacent the open outer end of said outlet conduit and adapted to permit solely exit of gases from said outlet conduit whenever the gas pressure therein is greater than the gas pressure at the side of said valve means opposite said outlet conduit, a compression inlet port positioned approximately at one said junction of said major and minor cylindrical curves which immediately follows said outlet port in angular position relative to the direction of rotation of said rotor, a compression outlet port positioned at approximately the mid-point along said minor cylindrical curve of said casing, a compression transfer channel having a venturi type configuration comprised of a converging section, a constricted throat section and a diverging section positioned in said casing, said compression transfer channel communicating between said compression inlet and outlet ports, one-way valve means interposed between said compression inlet port and said compression transfer channel, said interposed valve means being adapted to permit flow of gases solely from said compression inlet port into said compression transfer channel whenever the gas pressure in said compression inlet port is greater than the gas pressure in said channel, means positioned on said casing for dispensing finely divided droplets of combustible liquid fuel into said compression outlet port, and ignition means positioned approximately at the second said junction of said major and minor cylindrical curves for igniting a combustible fuel-air mixture injected into said combustion chambers during rotation of said rotor.

11. An engine in accordance with claim 10 in which a plurality of dowels extend axially into each end of said rotor and into said circular end plate adjacent thereto, said dowels being in frictional engagement with said rotor and said end plate thereby maintaining said rotor and said end plate adjacent each other in fixed position.

12. An engine in accordance with claim 10 in which an annular cap piece is mounted adjacent the end of each of said circular end plates, a portion of the exterior annular surface of said cap piece having a plurality of cam surfaces extending radially outward therefrom, said cam surfaces being the same in number as and in substantially angular alignment with said plurality of radial grooves in said rotor, a cam follower contacting said cam surfaces, and a rod attached to said cam follower for communicating reciprocating movement derived from said cam surfaces.

13. An engine in accordance with claim 10 in which an annular cover plate is mounted adjacent each of said annular L-shaped flanges at the ends of said casing, said cover plate providing a closed interior at each end of said casing and containing means for rotatably supporting said power shaft.

14. An engine in accordance with claim 10 in which the radii of curvatures of said major and minor cylindrical curves is defined according to the equation:

$$r_2 = \frac{r_1(a^2 + 2a \cos 1/2\theta + 1)}{2(a + \cos 1/2\theta)}$$

in which:

$r_1$ = the radius of curvature of said minor cylindrical curve, $\theta$ = the angle between any two successive radial grooves in said rotor, $a$ = a number from slightly greater than 1 to about 2.5, $r_2$ = the radius of curvature of said major cylindrical curve, and in which the distance between the centers of the radii of curvatures of said major and minor cylindrical curves are defined by the equation:

$$d = ar_1 - r_2$$

in which $a$, $r_1$ and $r_2$ are the same as in said first mentioned equation, the distance $d$ being measured from the center of said rotor along any radius extending therefrom.

No references cited.